United States Patent
Jovers et al.

(10) Patent No.: US 8,190,328 B2
(45) Date of Patent: May 29, 2012

(54) ELECTROPNEUMATIC CONTROL ARRANGEMENT FOR AN AUTOMATIC VEHICLE LEVEL CONTROL SYSTEM

(75) Inventors: Ingo Jovers, Gehrden (DE); Berend Kleen, Hannover (DE); Johann Lucas, Sehnde (DE); Frauke Rathjen, Hannover (DE); Andreas Rutsch, Hannover (DE); Andreas Schwarzer, Hemmingen (DE); Thomas Stellmacher, Stadthagen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 13/060,348

(22) PCT Filed: May 26, 2009

(86) PCT No.: PCT/EP2009/003700
§ 371 (c)(1),
(2), (4) Date: Apr. 29, 2011

(87) PCT Pub. No.: WO2010/022807
PCT Pub. Date: Mar. 4, 2010

(65) Prior Publication Data
US 2011/0208390 A1 Aug. 25, 2011

(30) Foreign Application Priority Data
Aug. 30, 2008 (DE) .......................... 10 2008 045 213

(51) Int. Cl.
*G06F 17/00* (2006.01)
(52) U.S. Cl. .......... 701/37; 701/34.1; 701/34.4; 701/69; 701/91; 701/83; 701/217; 701/78; 701/85; 701/103; 303/122.15; 62/196.1; 62/197; 62/228.5; 477/196; 477/198; 57/293; 57/350; 57/908

(58) Field of Classification Search ................... 701/37, 701/69, 91, 34.1, 34.4, 29, 78, 83, 85, 103, 701/217; 62/196.1, 197, 228.5; 57/293, 57/350, 908; 417/270, 277; 601/152; 134/166 C; 137/204; 335/271, 277; 400/124.17; 367/144; 181/120; 303/122.15; 477/196, 198
See application file for complete search history.

(56) References Cited

U.S. PATENT DOCUMENTS

| | | | |
|---|---|---|---|
| 5,035,582 A * | 7/1991 | Carroll et al. | 417/44.7 |
| 6,223,114 B1 * | 4/2001 | Boros et al. | 701/70 |
| 6,872,165 B2 * | 3/2005 | Gierer | 477/92 |
| 7,052,095 B2 * | 5/2006 | Roether et al. | 303/119.2 |

(Continued)

FOREIGN PATENT DOCUMENTS
DE    3815612 A2    11/1989
(Continued)

*Primary Examiner* — James Trammell
*Assistant Examiner* — McDieunel Marc
(74) *Attorney, Agent, or Firm* — Kramer Levin Naftalis & Frankel LLP

(57) ABSTRACT

An electropneumatic control arrangement for an automatic vehicle level control system, particularly of a commercial vehicle, includes at least; a solenoid valve unit having at least two electropneumatic solenoid valves, a compressed air inlet for infeeding compressed air, at least one compressed air connection for at least one air bellows and electrical control inputs, and an electronic control unit for actuating the solenoid valve unit. The electronic control unit comprises control outputs for electrically connecting to the control inputs of the solenoid valve unit. A plug connector is configured on the housing of the solenoid valve unit, in which the electrical control inputs are disposed, and a plug connector is provided on the housing of the electronic control unit, in which the control outputs are disposed. The plug connectors are mechanically plugged into each other.

14 Claims, 3 Drawing Sheets

U.S. PATENT DOCUMENTS

| | | | |
|---|---|---|---|
| 7,194,345 B2 | 3/2007 | Heer | |
| 7,344,145 B2 | 3/2008 | Duchet et al. | |
| 7,849,880 B2 | 12/2010 | Herges | |
| 7,884,494 B2 * | 2/2011 | Grimm et al. | 307/10.1 |
| 2007/0270006 A1 * | 11/2007 | Herges | 439/174 |
| 2008/0030068 A1 * | 2/2008 | Bensch et al. | 303/17 |
| 2008/0142096 A1 | 6/2008 | Kliffken et al. | |
| 2009/0090610 A1 * | 4/2009 | Grimm et al. | 200/520 |
| 2009/0280959 A1 * | 11/2009 | Bensch et al. | 477/198 |
| 2010/0038571 A1 * | 2/2010 | Frank et al. | 251/129.15 |

FOREIGN PATENT DOCUMENTS

| | | |
|---|---|---|
| DE | 19546324 A1 | 6/1997 |
| EP | 1464556 A1 | 10/2004 |
| EP | 1647425 A2 | 4/2006 |
| EP | 1731335 A1 | 12/2006 |
| EP | 1731395 A1 | 12/2006 |
| WO | 2004030956 A1 | 4/2004 |
| WO | 2006045489 A1 | 5/2006 |
| WO | 2006122906 A1 | 11/2006 |

* cited by examiner

ELECTROPNEUMATIC CONTROL ARRANGEMENT FOR AN AUTOMATIC VEHICLE LEVEL CONTROL SYSTEM

FIELD OF THE INVENTION

The present invention generally relates to embodiments of an electropneumatic control arrangement for controlling the ride level of a vehicle, in particular a commercial vehicle.

BACKGROUND OF THE INVENTION

An electropneumatic control arrangement with a solenoid valve unit that is connected to a compressed-air supply is generally provided on vehicles with air bellows or air springs for the purpose of ride level control, with the compressed-air supply being connected to a compressed-air accumulator or else directly to a compressor. An electronic control device (ECU) drives the solenoid valve unit in order to distribute compressed air to the connected compressed-air lines, which lead to the air bellows, in order to raise the vehicle, and discharge air from the air bellows to an outlet in order to lower the vehicle, or to block the air in order to maintain the ride level.

The solenoid valve unit is generally driven by means of a control device provided in the driver's compartment. To this end, electric cables are to be laid from the control device to the solenoid valve unit such that, even in the event vibrations occur, the cables cannot rupture and proper contact can be made with the cables.

SUMMARY OF THE INVENTION

It is an object of the present invention to provide an electromagnetic control arrangement that allows reliable yet simple mounting.

According to embodiments of the present invention, the electronic control device is mounted directly on the solenoid valve unit, with contact being made by virtue of a plug connection. The plug connection can be formed, in particular, by corresponding complementary plug connectors on the housing of the solenoid valve unit and the control arrangement.

According to a preferred embodiment, the control unit is mounted solely on the solenoid valve unit; therefore, no further means for fixing the control device to the vehicle structure are required. In addition, for example, screw connections or latching mechanisms, for example clips, which prevent the plug connection from becoming detached in the event of vibrations or other forces and moments, can be provided in order to ensure secure mechanical fixing.

It will be appreciated that the time-consuming and cost-intensive laying of cables between the electronic control device and the solenoid valve unit is dispensed with. As a result, security against rupturing of the cables and other damage that can occur in the event of vibrations and active forces and moments is increased. Mounting is simplified since no separate fixing is performed in the driver's compartment. For servicing purposes, the two parts can be correspondingly disconnected and replaced separately.

The electronic control device can contain, in particular in a housing, a circuit mount with electronic components, that is, in particular, a microcontroller, driver circuits and the plugs, mounted on it. In this case, the plugs can, for example, face the same side or else opposite sides, and so a high level of flexibility in terms of physical arrangement is permitted.

Still other objects and advantages of the present invention will in part be obvious and will in part be apparent from the specification. The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention will be explained below using several embodiments with reference to the attached figures, in which.

DETAILED DESCRIPTION OF THE PREFERRED EMBODIMENTS

Figure 1:
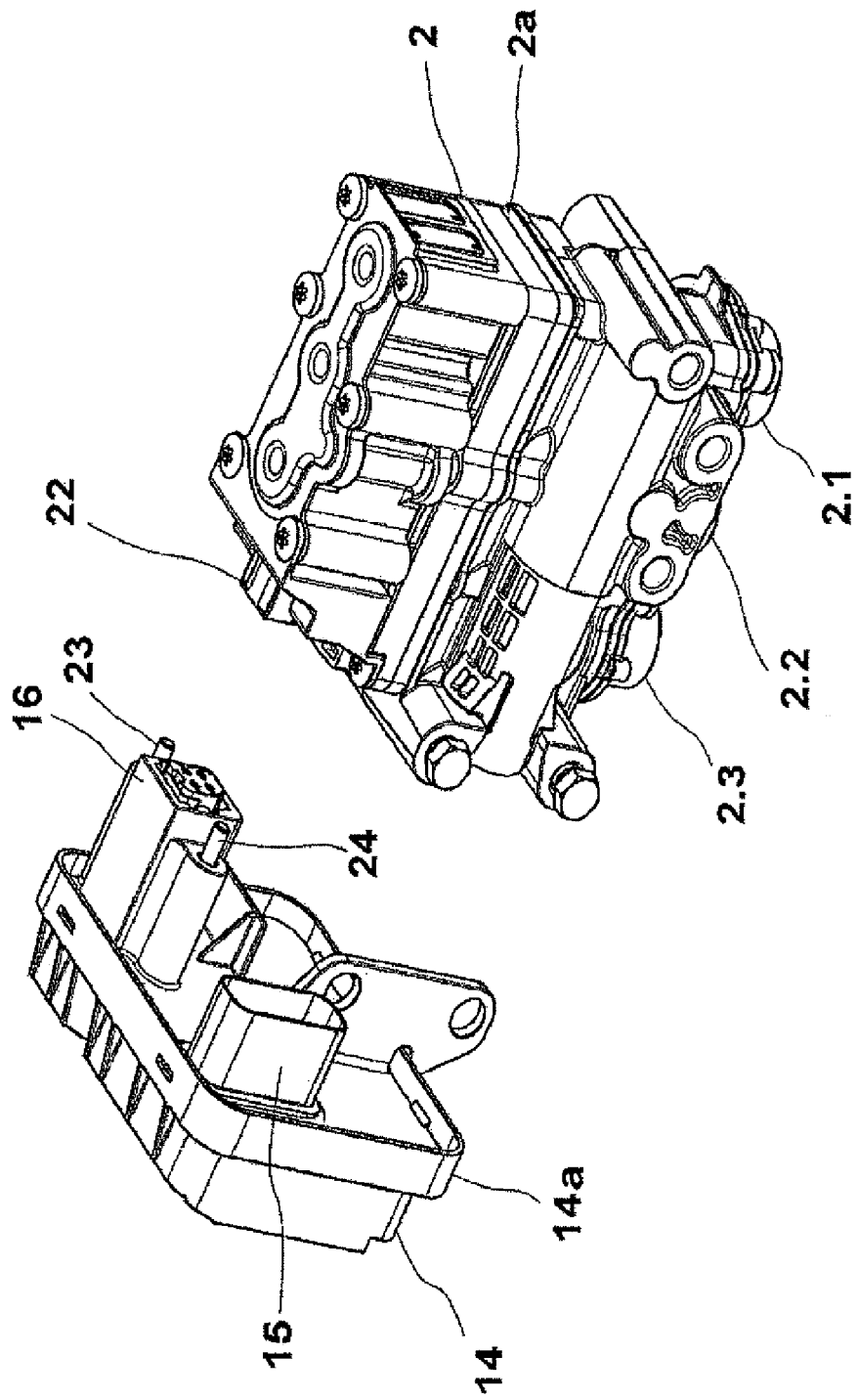
FIG. 1 is a separated illustration of an electropneumatic control arrangement for a ride level control system of a vehicle according to a first embodiment of the present invention.
Figure 2:
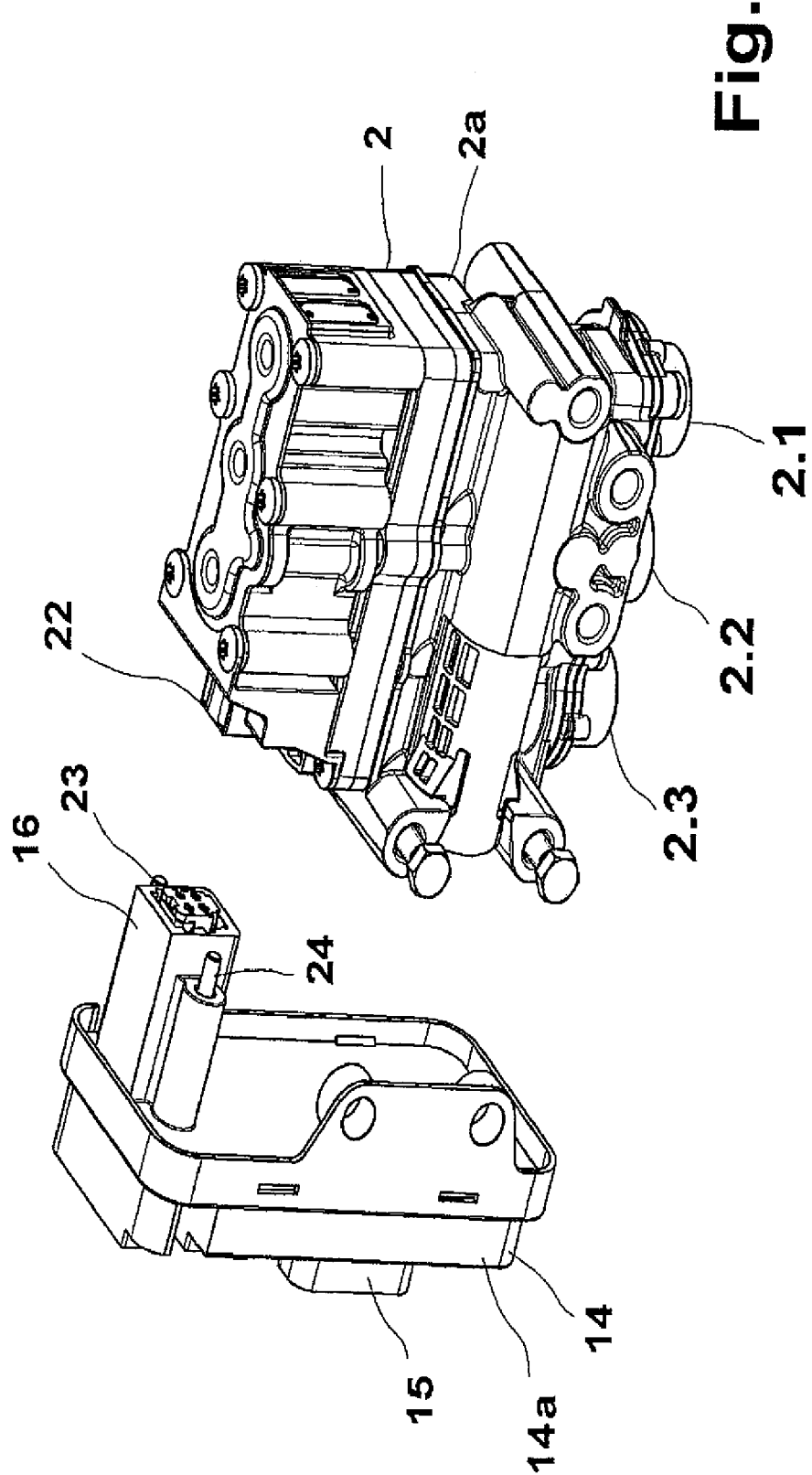
FIG. 2 is a separated illustration of an electropneumatic control arrangement according to a further embodiment of the present invention.

According to FIG. 1 and FIG. 2, an electropneumatic control arrangement 1 for ride level control of an axle has a solenoid valve unit 2 and an electronic control device (ECU) 14.

Figure 3:
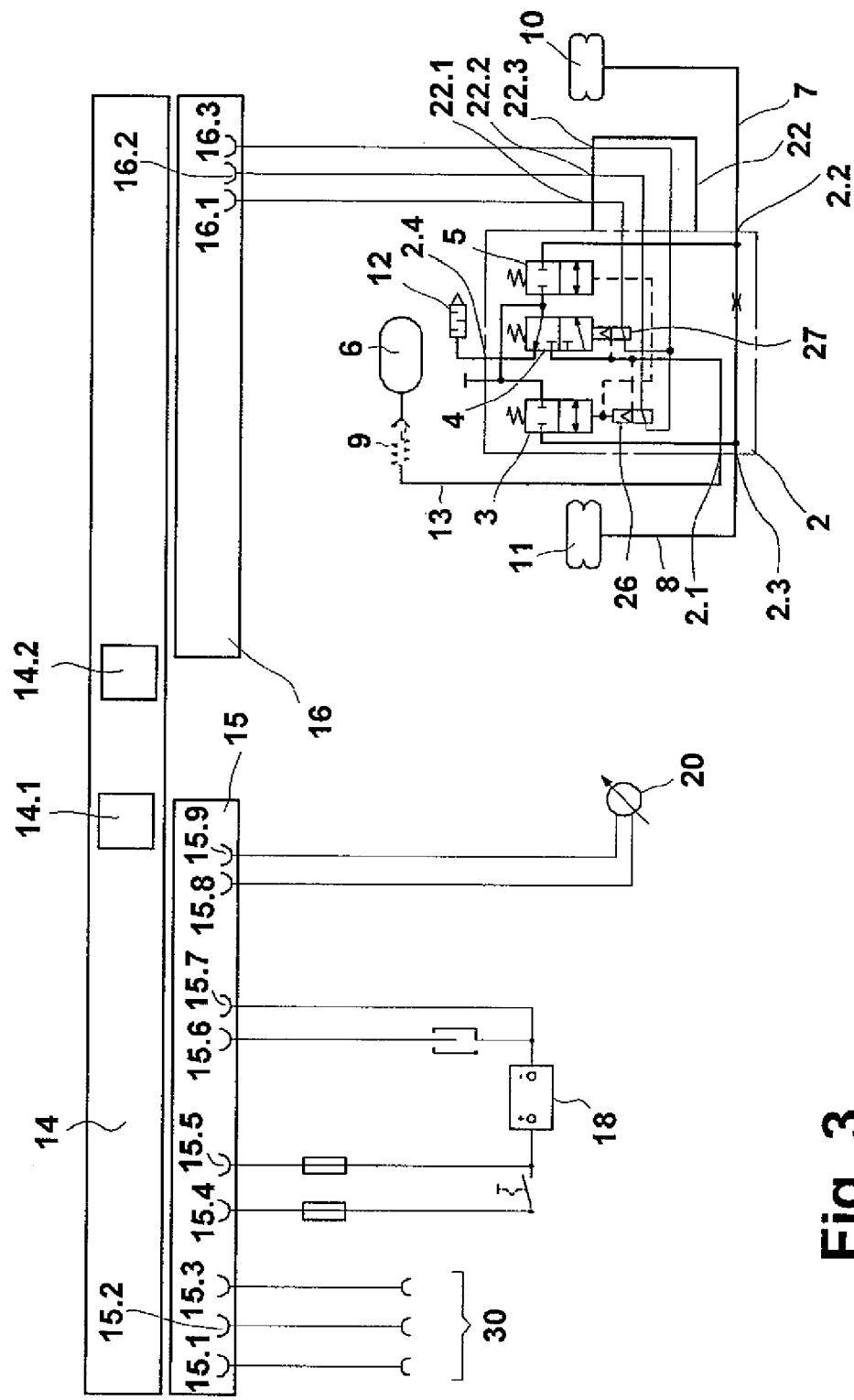
FIG. 3 is an electropneumatic circuit diagram of a pneumatic ride level control system having the electropneumatic control arrangement according to an embodiment of the present invention.

The solenoid valve unit 2 has, in a housing 2a, two pilot control devices 26 and 27 for driving three solenoid valves 3, 4, 5 in parallel, the functioning of the solenoid valves being shown in detail in the circuit diagram of FIG. 3. A compressed-air inlet 2.1, two compressed-air connections 2.2 and 2.3 and a compressed-air outlet 2.4 are provided on the housing 2a. The compressed-air inlet 2.1 is connected to a compressed-air line 13 that, optionally by means of a non-return valve 9, leads to a compressed-air accumulator 6 that is fed by a compressor in a known manner that is not illustrated here. The compressed-air connections 2.2 and 2.3 are each connected to a compressed-air line 7 and 8, connected to one another by means of a throttle, and lead to air bellows 10, 11. In this embodiment, the air bellows 10, 11 are provided on an axle of the vehicle, that is on the left and right. As an alternative to this, the solenoid valve unit 2 can also serve to control the ride level of two axles, and so the compressed-air lines 7 and 8 are not connected to one another and each compressed-air line is connected to two air bellows. A silencer 12 is connected to the compressed-air outlet 2.4.

The electronic control device (ECU) 14 has a housing 14a on which two plugs 15 and 16 are formed. According to the circuit diagram of FIG. 3, the plug 15 has the connections 15.1, 15.2 and 15.3 for a CAN bus 30 of the vehicle. Also provided are connections 15.4, 15.5, 15.6 and 15.7 for connection to the battery 18 of the vehicle or to the on-board electrical system of the vehicle for the 24 V voltage supply. Connections 15.8 and 15.9 for the connection of a sensor 20 for measuring the level height at the axle are also provided on the plug 15 according to the embodiment shown; it, correspondingly, also being possible to connect a plurality of such sensors 20 to the plug 15 by means of corresponding connections.

In the embodiment of FIG. 1, the two plugs 15 and 16 are provided on the same side of the housing 14a. In the alternative embodiment of FIG. 2, the two plugs 15 and 16 are formed on the opposite sides of the housing 14a, but otherwise have the same functionality.

The electronic control device 14 has, in a known manner, a microcontroller 14.1 and driver circuits, for example driver ASICs 14.2, on a common printed circuit board or circuit mount to which the plugs 15 and 16 are also connected.

The second plug 16 has connections 16.1, 16.2 and 16.3 that enter the solenoid valve unit 2 as control connections.

According to embodiments of the present invention, a plug connection is formed between the solenoid valve unit 2 and the electronic control device (ECU) 14 in this case by the second plug 16 being placed into a mating plug 22 formed on the housing 2a of the solenoid valve unit 2. The plug connection, correspondingly, has three connections 22.1, 22.2 and 22.3, of which one connection, for example connection 22.3, serves as a ground connection and the other connections 22.1 and 22.2, with which the connections or contacts 16.1 and 16.2 make contact, serve to drive the electrical pilot control devices 26 and 27 of the two solenoid valves 3 and 4.

In addition, screw connections can be provided between the housings 14a and 2a. For this purpose, for example, screws 23 and 24 that are screwed into corresponding screw threads in the housing 2a are accommodated in the housing 14a. The screws 23 and 24 serve to provide security, so that the plug connections 22 and 23 cannot be detached from one another due to vibrations and other active forces and moments.

The entire electropneumatic control arrangement 1 is jointly fixed in the vehicle, preferably to a structural part of the vehicle. In this case, the solenoid valve unit 2, in particular, can be fixed by way of its housing 2a to the structural part, and so the electronic control device 14 is fixed solely to the housing 2a of the solenoid valve unit 2 and is not fixed anywhere else in the vehicle.

The internal design of the solenoid valve unit 2 is known. For example, a 3/2-way valve 4 can be connected to the compressed-air inlet 2.1, the outputs of the 3/2-way valve being connected to the inputs of the 2/2-way valves 3 and 5, with, for example, the valves 3 and 5 initially providing blocking in an inoperative position in which no power is supplied, and the valve 4 connecting the common output line of the valves 3 and 5 to the compressed-air output 2.4 and therefore to the silencer 12 in the state in which no power is supplied. If the pilot control unit 27 switches the 3/2-way valve 4 to the open position, compressed air is applied to the inputs of the 2/2-way valves 3 and 5, and so, in the event of subsequent driving of the valves 3 and 5 by means of the pilot control unit 26, compressed air is correspondingly applied to the compressed-air outputs 2.3 and 2.2 and the compressed air is therefore discharged to the air bellows 10 and 11. If the 2/2-way valves 3 and 5 are driven by means of their pilot control unit 26 and the 3/2-way valve is not adjusted, compressed-air can therefore be discharged via the compressed-air connections 2.2 and 2.3 and the compressed-air outlet 2.4 and the silencer 12 for the purpose of lowering the ride level.

The housings 2a and 14a are formed, in particular with two or more shells, from plastic and/or metal.

The two embodiments of FIGS. 1 and 2 can be selected, optionally depending on the installation position and the installation space available, in order to be able to correspondingly position the electrical connections.

During mounting, the solenoid valve device 2 is therefore fixed to a structural part of the vehicle, the compressed-air lines 7, 8, 13 are connected and the electronic control device 14 is mounted and contact-connected by plugging or inserting one into the other the plug connectors 16 and 22 and tightening the screws 23 and 24, it also being possible to perform this fixing operation before mounting on the vehicle.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense. It is also to be understood that the following claims are intended to cover all of the generic and specific features of the invention herein described and all statements of the scope of the invention that, as a matter of language, might be said to fall therebetween.

What is claimed is:

1. An electropneumatic control arrangement for controlling the ride level of a vehicle, comprising:
 a solenoid valve unit including at least two electropneumatic solenoid valves, a compressed-air inlet for a compressed-air supply line, at least one compressed-air connection for at least one air bellows and electrical control inputs; and
 an electronic control device for driving the solenoid valve unit, the electronic control device having control outputs for effecting an electrical connection to the control inputs of the solenoid valve unit;
 a first plug connector on a housing of the solenoid valve unit, the electrical control inputs being arranged in the first plug connector; and
 a second plug connector on a housing of the electronic control device, the control outputs being arranged in the second plug connector;
 the first and second plug connectors being mechanically insertable one into the other.

2. The control arrangement as claimed in claim 1, wherein the electrical connection between the solenoid valve unit and the electronic control device is formed solely by connection of the first and second plug connectors.

3. The control arrangement as claimed in claim 1, further comprising an interlocking connection, between the solenoid valve unit and the control device.

4. The control arrangement as claimed in claim 3, wherein the interlocking connection is formed at least one of in and on the first and second plug connectors.

5. The control arrangement as claimed in claim 1, wherein the solenoid valve unit is affixed to the vehicle, and wherein the electronic control device is mounted solely on the solenoid valve unit and is supported by the solenoid valve unit.

6. The control arrangement as claimed in claim 1, further comprising, a third plug connector on the housing of the electronic control device for connection to at least one electrical supply voltage and to a data line of the vehicle.

7. The control arrangement as claimed in claim 6, wherein the third plug connector includes sensor connections for at least one sensor for measuring a level height for ride level control of the vehicle.

8. The control arrangement as claimed in claim 6, wherein the second and third plug connectors are provided on the same side of the housing of the electronic control device.

9. The control arrangement as claimed in claim 6, wherein the second and third plug connectors are provided on opposite sides of the housing of the electronic control device.

10. The control arrangement as claimed in claim 1 wherein the electronic control device includes a circuit mount, and, wherein, a microcontroller and at least one driver circuit for driving the solenoid valves is mounted on the circuit mount.

11. The control arrangement as claimed in claim 1 wherein the solenoid valve unit includes a 3/2-way valve and at least two 2/2-way valves to selectively at least one of block and unblock the at least one compressed-air connection at one of a compressed-air inlet and a compressed-air outlet for discharging compressed-air.

12. The control arrangement as claimed in claim 11, further comprising two electrical pilot control units providing in the housing of the solenoid valve device for driving the solenoid valves.

13. A vehicle, comprising an electropneumatic control arrangement as claimed in claim 1.

14. A method for mounting an electropneumatic control arrangement as claimed in claim 1 on a vehicle, the method comprising the steps of:
  connecting compressed-air lines to compressed-air connections of the solenoid valve device;
  affixing of the solenoid valve device to the vehicle; and
  plugging the electronic control device onto the solenoid valve device.

* * * * *